Figure 1:
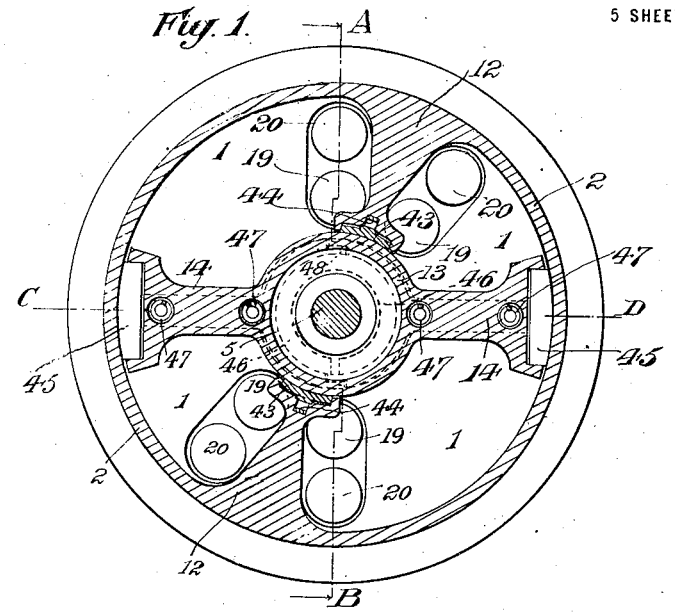

G. R. INSHAW.
ROTARY INTERNAL COMBUSTION ENGINE.
APPLICATION FILED DEC. 29, 1911.

1,142,576.

Patented June 8, 1915.
5 SHEETS—SHEET 1.

WITNESSES
L. H. Grote
N. G. Keis

INVENTOR
George Richard Inshaw
BY
Howson and Howson
his ATTORNEYS

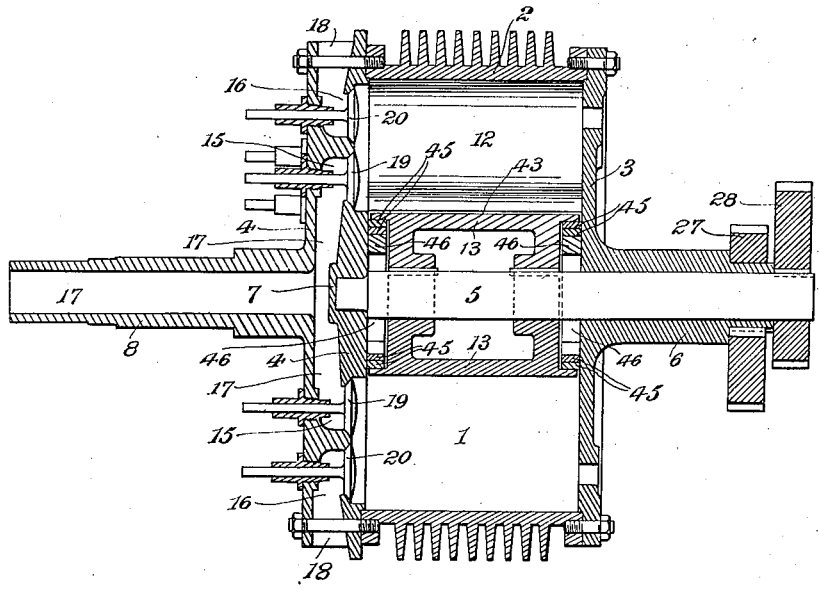
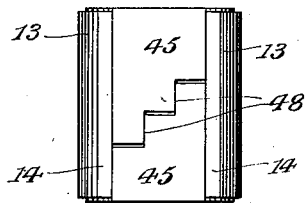

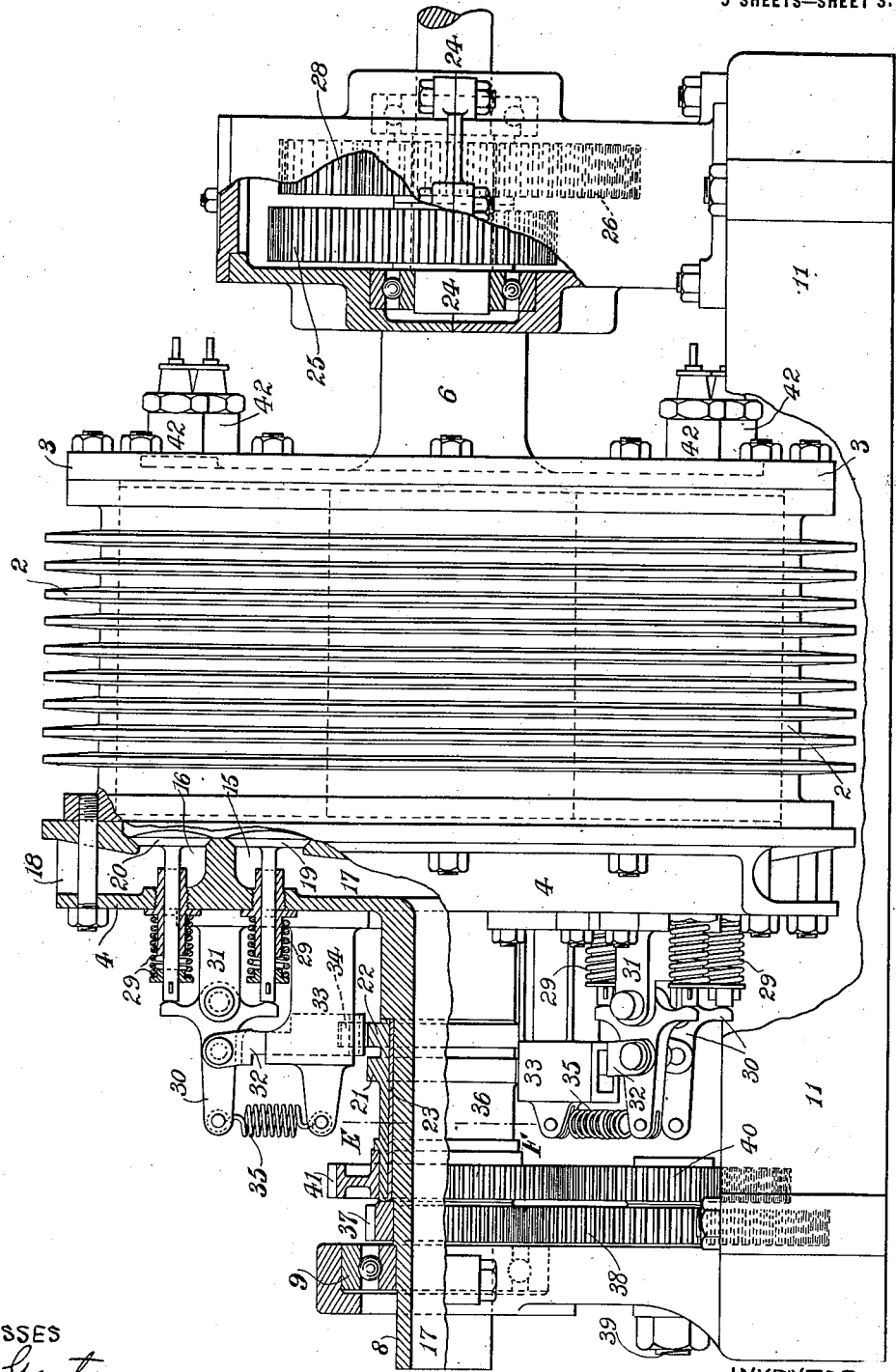

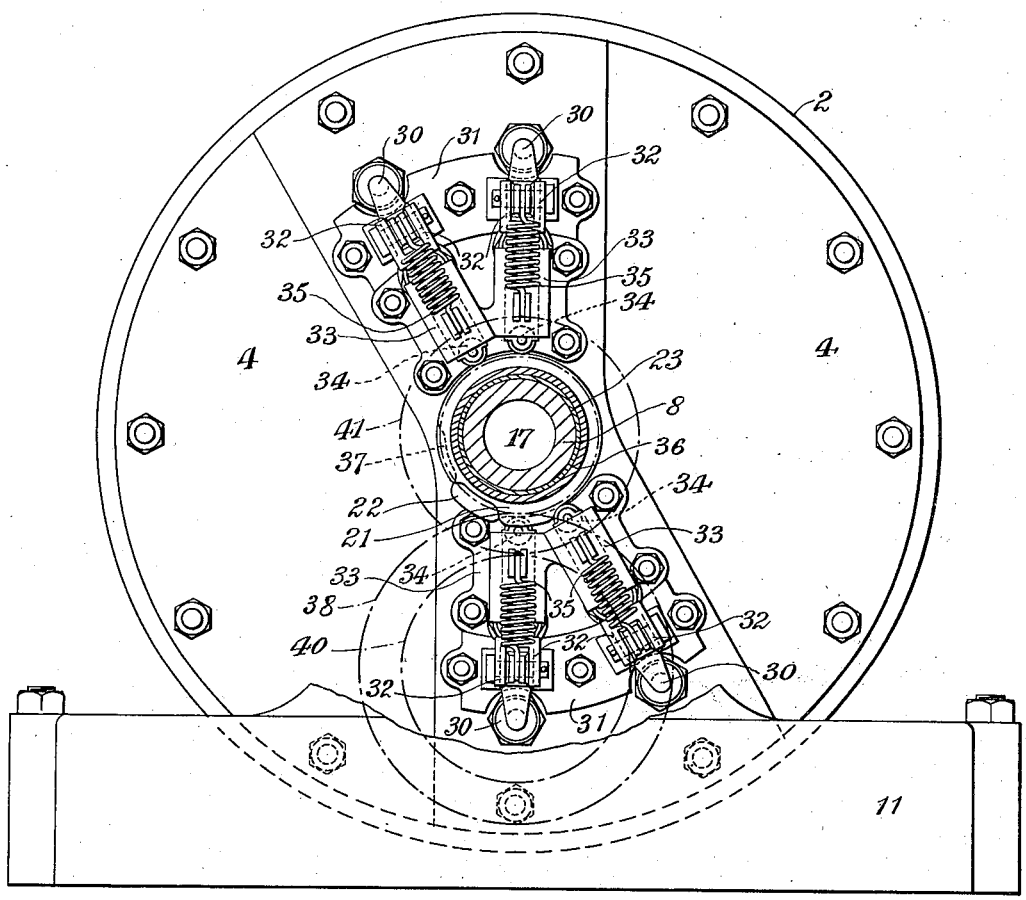

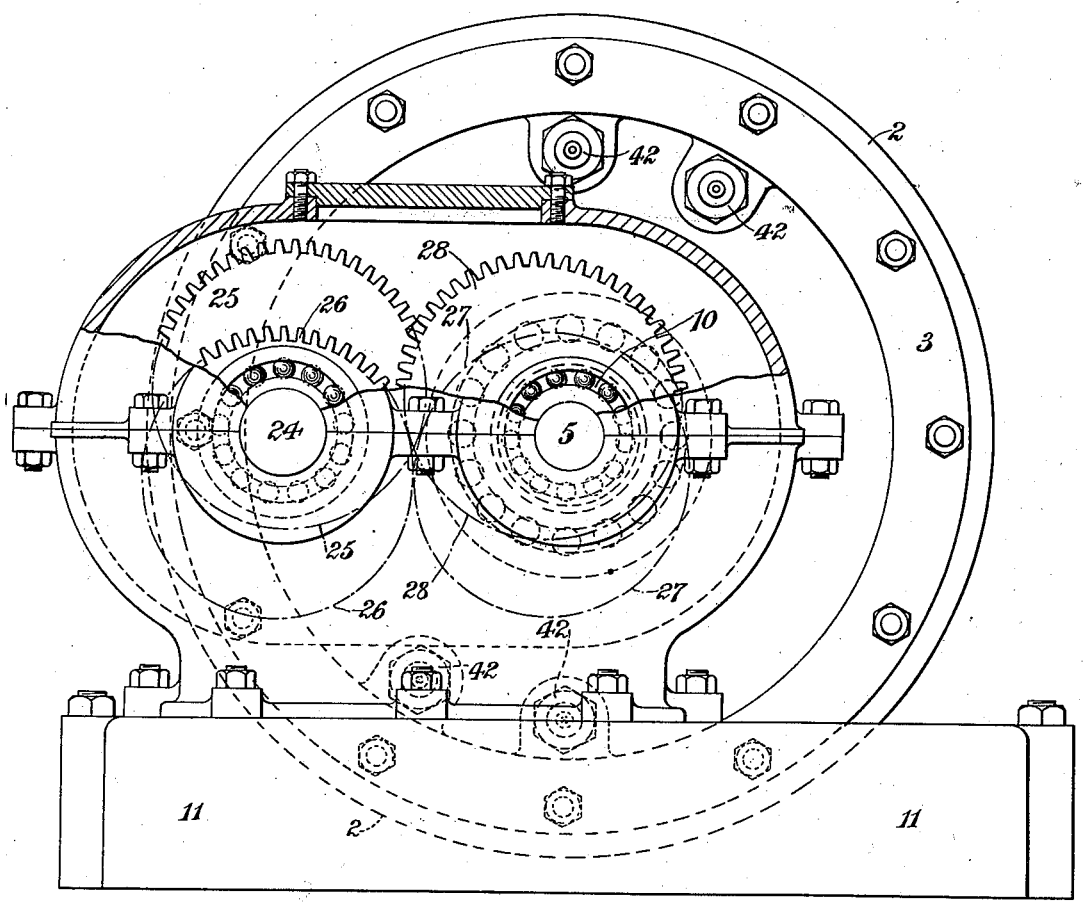

UNITED STATES PATENT OFFICE.

GEORGE RICHARD INSHAW, OF UDDINGSTON, SCOTLAND.

ROTARY INTERNAL-COMBUSTION ENGINE.

1,142,576.  Specification of Letters Patent.  Patented June 8, 1915.

Application filed December 29, 1911. Serial No. 668,576.

*To all whom it may concern:*

Be it known that I, GEORGE RICHARD INSHAW, a subject of the King of Great Britain and Ireland, and residing at The Grange, Uddingston, in the county of Lanark, Scotland, have invented certain new and useful Improvements in Rotary Internal-Combustion Engines, of which the following is a specification.

My invention relates to rotary internal combustion engines of the geared vane type, in which two sets of vanes capable of revolving in the same direction at different speeds are situated within a closed rotatable annular chamber, one set of two vanes being secured to, or formed in one with the drum, or casing, forming the said chamber, and the vanes of the other set of two vanes being carried by a sleeve, or boss, on a shaft passing through the said chamber, upon which shaft the chamber is rotatably mounted. In this type of rotary engine when the engine is running in one direction, one set of vanes always act as abutment vanes and the other set always act as piston vanes, and while the drum, or casing, rotates at a constant speed the shaft rotates at a variable speed, the differing speeds of the two sets of vanes being brought about by means of cranks. It has been proposed in rotary steam engines to employ two sets of single vanes, one secured to a shaft and one secured to a sleeve on the said shaft, and the relative speeds of rotation of these vanes have been so controlled by elliptical eccentrically mounted toothed wheels situated outside the annular chamber that they each alternately act as piston and abutment vanes, the drum, or casing being stationary.

According to my invention I so construct a rotary internal combustion engine of the type referred to that each of the vanes successively acts as the driving member once in every two rotations of the driven shaft, so that, assuming that one set of two vanes are carried on the drum, or casing, constituting the annular chamber, and one set of two vanes are carried on the shaft passing through the said chamber, two complete cycles of operations are obtained at each revolution of the driven shaft and by the revolution of the respective sets of vanes at differing speeds, they approach and recede from each other in such manner that at each explosion in one space between the vanes, explosive mixture is drawn into another space compressed in another space and exhausted in another space simultaneously. If desired I may employ two sets of more than two vanes in which more than two complete cycles of operations would be obtained at each revolution of the driven shaft.

Toothed wheels eccentrically mounted are employed for transmitting rotary motion between the driven shaft of the engine and the drum, or casing, constituting the annular chamber and between the said driven shaft and the shaft passing through the said chamber so that the driven shaft receives an impulse both from the drum, or casing, constituting the annular chamber and from the shaft passing through the said chamber alternately, once in each rotation of the driven shaft, which rotates at uniform speed, the said toothed wheels also causing each of the vane-carrying members to move alternately at a quicker and a slower speed than the driven shaft.

I will describe, with reference to the accompanying drawings, a rotary internal combustion engine of the four cycle type constructed in accordance with my invention.

Figure 3:
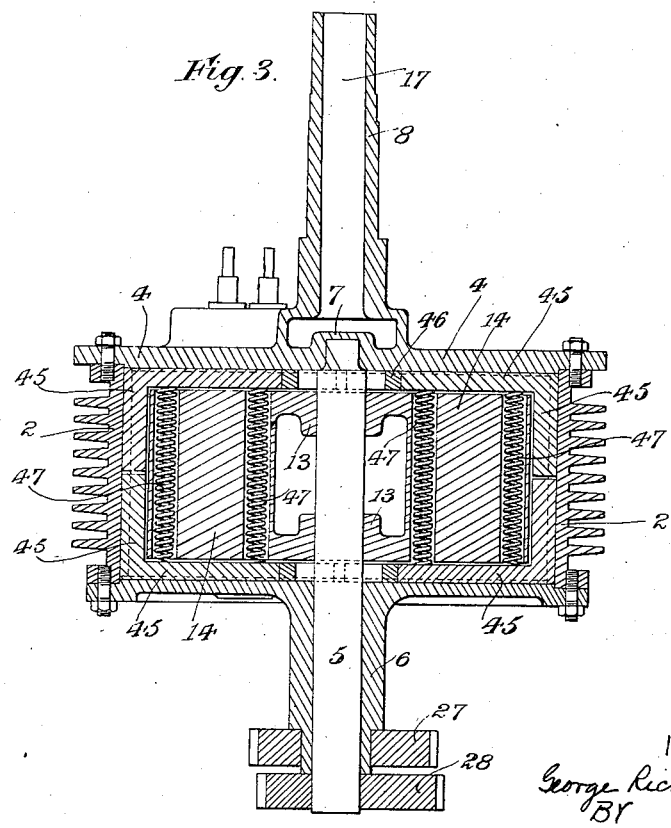

Figure 1 is a transverse section and Fig. 2 is a section taken on the line A, B, Fig. 1, showing an annular chamber provided with vanes formed in one therewith, or secured thereto, and rotatably mounted on, a shaft having vanes on a sleeve, or boss, secured thereto. Fig. 3 is a section on the line C, D, Fig. 1. Fig. 4 is an end view of the vanes shown in Fig. 3. Fig. 5 is a longitudinal elevation of the engine, partly in section, Fig. 6 is an end elevation partly in section on the line E, F, Fig. 5, and Fig. 7 is an end view showing means for rotating the driven shaft at a uniform, or approximately uniform, speed, and for controlling the necessary relative movements of the vanes.

An annular chamber 1 is constituted by a drum 2 closed at its ends by covers 3 and 4, and is rotatably mounted upon a shaft 5 by providing a sleeve 6 on the cover 3, through which the shaft 5 passes, and a recess in a boss 7 on the cover 4 to receive the inner end of the said shaft 5.

The cover 4 is provided with a hollow trunnion 8, which trunnion and the sleeve 6 rotate, respectively, in bearings 9 and 10 carried in standards on the framing, or bedplate, 11 of the engine.

From the inner circumferential wall of the annular chamber 1, two diametrically opposite vanes 12 project and are provided with means for making fluid-tight sliding contact with the sleeve, or boss, 13 secured to the shaft 5. Secured to, or formed in one with, the said sleeve, or boss, 13 are two diametrically opposite vanes 14 which project outward and are provided with means for making fluid-tight sliding contact with the inner wall of the annular chamber 1. In the cover 4 are inlet ports 15 and exhaust ports 16 communicating with the chamber 1, and with inlet and exhaust passages 17 and 18 respectively, and these ports 15 and 16 are controlled by valves 19 and 20 respectively, operated by any suitable mechanism which may, for instance, be carried on the outer side of the cover 4 as shown and be actuated at the required times by cams 21 and 22 formed on a sleeve 23 on the hollow trunnion 8 and rotated at speeds different from the speed of the drum 2. The inlet and exhaust ports 15 and 16 are arranged in pairs preferably as shown adjacent to each side of the vanes 12 of the annular chamber 1. The inlet and exhaust passages 17 and 18 respectively may communicate with passages in non-rotating parts of the engine in any convenient manner. The vanes 12 of the annular chamber 1, and the vanes 14 on the sleeve, or boss, 13, carried by the shaft 5 upon which the annular chamber rotates, act alternately as piston vanes and constitute abutment vanes, and the driven shaft 24 of the engine is driven by gearing both from the drum 2 and from the shaft 5, this gearing also controlling the movement of the vanes. The said driving and control are shown as being effected by eccentrically mounted toothed wheels which are arranged as follows: To the driven shaft 24 of the engine are secured two toothed wheels 25 and 26 eccentrically mounted in such a manner that their longest radii are diametrically opposite each other, or approximately so. These toothed wheels 25 and 26 engage respectively with a toothed wheel 27 eccentrically mounted on the sleeve 6 on the cover 3 of the drum 2 and a toothed wheel 28 eccentrically mounted on the shaft 5 on which the said drum rotates. When either of the two parts (the drum 2 and its vanes, or the shaft 5 and its vanes,) is acting as the driver, the minor part of the toothed wheel secured thereto is in engagement with the major part of its engaged toothed wheel secured to the driven shaft 24, and a vane of the other of the said two parts acts as an abutment, the major part of the toothed wheel in connection therewith, being in engagement with the minor part of its co-acting toothed wheel secured to the said driven shaft 24, the ratio of the respective toothed wheels being such that the said shaft 24 is always driven at an approximately uniform speed.

When a charge of combustible mixture has been admitted to between two co-acting vanes 12, 14, and has been compressed and is about to be ignited, presuming the piston vane for the impending stroke is on the drum 2, then, by the ignition of the charge and its consequent action upon the abutment vane 14 on the sleeve, or boss, 13 and the piston vane 12 on the drum 2, the said drum will be rotated and its motion transmitted to the driven shaft 24 by the toothed wheel 27 secured to the sleeve 6 on the cover 3 of the drum 2, and the corresponding toothed wheel 25 secured to the said driven shaft 24, the opposite side of the piston vane 12 at this time compressing a charge which has been admitted between this said side and the vane 14 on the sleeve, or boss, 13, while simultaneously therewith the vane 12, diametrically opposite to the aforesaid piston vane, acts to draw in a charge between it and the vane 14 on the sleeve, or boss, 13 and the exhaust gases (due to the previous ignition) are expelled between it and the vane 14, diametrically opposite to the before mentioned vane on the sleeve, or boss, 13. The rotary movement of the drum 2 causes the piston vane 12 thereon to compress the mixture between it and the vane 14 on the sleeve, or boss, 13, as before mentioned, and the parts are now in position for the compressed charge to be ignited, when the vane 14 on the sleeve, or boss, 13 becomes the piston vane, while the vane 12 on the drum 2 becomes the abutment vane, so that further rotation is imparted to the driven shaft 24 from the shaft 5, and so on during the action of the engine.

Each of the respective pairs of inlet and exhaust valves 19 and 20 are caused to be opened in opposition to a spring 29 by a three-armed lever 30 pivoted to a bracket 31 carried by the cover 4 of the drum 2. Two arms of the said lever 30 bear upon the stems of the said valves so that, when the said lever is turned on its pivot in either direction, one of the stems is pushed inward and the valve opened. Each three-armed lever 30 is operated by a piece 32 slidable in a bracket 33 secured to the cover 4, the said slidable piece 32 having on its inner end an antifriction roller 34, which is held in contact with its cam 21, or 22, by a spring 35. The cams 21 and 22 are formed in one with the sleeve 36, to which rotary motion, at the required speed, is transmitted from the drum 2 in the following manner:—To the hollow trunnion 8 of the cover 4 is secured a toothed wheel 37 which engages with a toothed wheel 38 rotatably mounted on a stud 39. Formed in one with the toothed wheel 38 is another toothed wheel 40, which engages with a toothed wheel 41 secured to the sleeve 36 of the cams 21 and 22. The diameters of these toothed wheels are so proportioned that the cams 21 and 22 are caused to rotate at half the speed of the drum 2, so that the valves are operated to permit of the four cycle operation of the engine.

In the arrangement described, the surplus velocity of the vane-carrying member rotating at a decreasing speed will be utilized to increase the speed of the other vane-carrying member, so that when the speed of one vane-carrying member is increasing, the speed of the other vane-carrying member is decreasing, and although the vane-carrying members rotate at varying speeds, a compensating, or balancing, effect is obtained on the driven shaft by reason of the throws of the toothed wheels being diametrically opposite each other, and the engine can be operated at very high speeds.

Any convenient means may be employed to eject the ignition of the explosive mixture at the proper time. I have shown in the drawings sparking plugs 42 for effecting this, but if desired the engine can be made self-igniting after the initial ignition. This can be effected by providing valve-controlled passages through the vanes by means of which ignited gas in one compartment of the annular chamber will, at the proper times, cause the ignition of the compressed mixture in the next compartment of the said chamber, or sufficient heat from the already ignited charge may be conducted through the wall of the vane to ignite the fully compressed mixture in the succeeding compartment of the chamber.

Fluid-tight joints in the annular chamber 1 may be made in any convenient way, but I prefer to make them as shown in Figs. 1, 2, 3 and 4. In recesses formed in the ends of the vanes 12 are packing pieces 43 which are held in frictional contact with the sleeve, or boss, 13 by means of blade springs 44 interposed between the said pieces 43 and the vanes 12. The vanes 14 are provided with four approximately L-shaped packing pieces 45, adapted to slide in grooves formed in the sides and peripheral faces of the said vanes. The said packing pieces 45 are caused to move radially outward by C-springs 46, so that they are held in frictional contact with the inner circumferential wall of the annular chamber 1 and they are acted upon in a direction transverse of the said chamber by coiled springs 47 passing through holes formed in the said vanes 14 so that the said packing pieces are held in frictional contact with the side walls, or covers, 3 and 4 of the annular chamber. The parts of juncture of the several pieces 45 with each other are stopped, as shown at 48, to allow of movement of the said parts without leakage of the fluid.

I do not limit myself to the precise details of construction hereinbefore described and shown in the accompanying drawings, as they can be varied without departing from the nature of my invention. For example, instead of toothed wheels gearing with each other, chains can be used for coupling the wheels which effect the driving and control, or a train of toothed wheels may be used for gearing the vane-carrying members with the driven shaft of the engine. By the use of a train of wheels, a greater variation of speed of the vane-carrying members will be permissible, while the speed of the driven shaft remains uniform.

It will be understood that the engine can be constructed not only with two vanes in each set as described and illustrated, but also with any suitable number of vanes more than two in each set, and therefore where in the following claims I mention "two vanes", I do not exclude the use of more than two in each set.

I claim as my invention:—

1. A rotary internal combustion engine having an annular chamber with sets of inlet and exhaust ports and ignition means, and two sets of constantly rotating vanes with two vanes in each set, in combination with two concentric rotatable members operating in conjunction with said vanes, one of which members is the annular chamber, a shaft and means for transmitting the motions of the sets of vanes to said shaft.

2. In a rotary internal combustion engine of the type referred to, the combination of an annular chamber with sets of inlet and exhaust ports and ignition means, two sets of vanes with two vanes in each set, the annular chamber carrying one set, a shaft upon which the annular chamber rotates and which carries the other set of vanes, and means whereby the said chamber and shaft with their vanes are caused to rotate in the same direction at varying speeds, and each vane is caused to act alternately as a piston vane and as an abutment vane, and the conjoint varying motions of the said chamber and shaft are transmitted to impart uniform motion to a driven rotatable body.

3. A rotary internal combustion engine of the type referred to, having an annular chamber with sets of inlet and exhaust ports and ignition means, a shaft on which the annular chamber rotates, the said shaft and chamber each carrying two vanes, a toothed wheel at the exterior of the annular chamber and a toothed wheel on the shaft upon which said chamber rotates, a driven shaft, gearing connecting the same to said toothed wheels, the gearing being such as described, whereby the proper relative and varying speeds of the rotary members and their sets of vanes will be such that at each explosion in one space between the vanes explosive mixture is drawn into another space, compressed in another space, and exhausted from another space, simultaneously and also transmit uniform motion to the driven shaft, substantially as hereinbefore explained.

4. In a rotary internal combustion engine of the type referred to, the combination of an annular chamber provided with two vanes and valve-controlled inlet and outlet ports, and ignition means, a shaft upon which the annular chamber rotates concentrically, two vanes carried by said shaft, an eccentrically mounted toothed wheel on the exterior of the annular chamber, and an eccentrically mounted toothed wheel on the shaft upon which the said annular chamber rotates, a driven shaft, two eccentrically mounted toothed wheels geared respectively to the toothed wheels of said first mentioned shaft and chamber, substantially as and for the purposes described.

5. A rotary internal combustion engine comprising a rotary annular chamber and internal vanes rotating therewith, an independent rotor within said chamber and coöperating vanes thereon, said chamber and rotor rotating constantly during the operation of the engine at constantly varying speeds, means for admitting an explosive mixture between adjacent vanes at one point in their revolution, means for exploding said mixture at another point and means for exhausting the exploded gases at another point, for the purpose described.

In testimony whereof I have signed my name to this specification in the presence of two subscribing witnesses.

GEORGE RICHARD INSHAW.

Witnesses:
GILBERT FLETCHER TYOM,
WILLIAM GERALD REYNOLDS.